Oct. 14, 1924.　　　　　　　　　　　　　　　　　　　　　　　1,511,863
M. ZIELINSKI
SHAFT COUPLING
Filed June 15, 1922
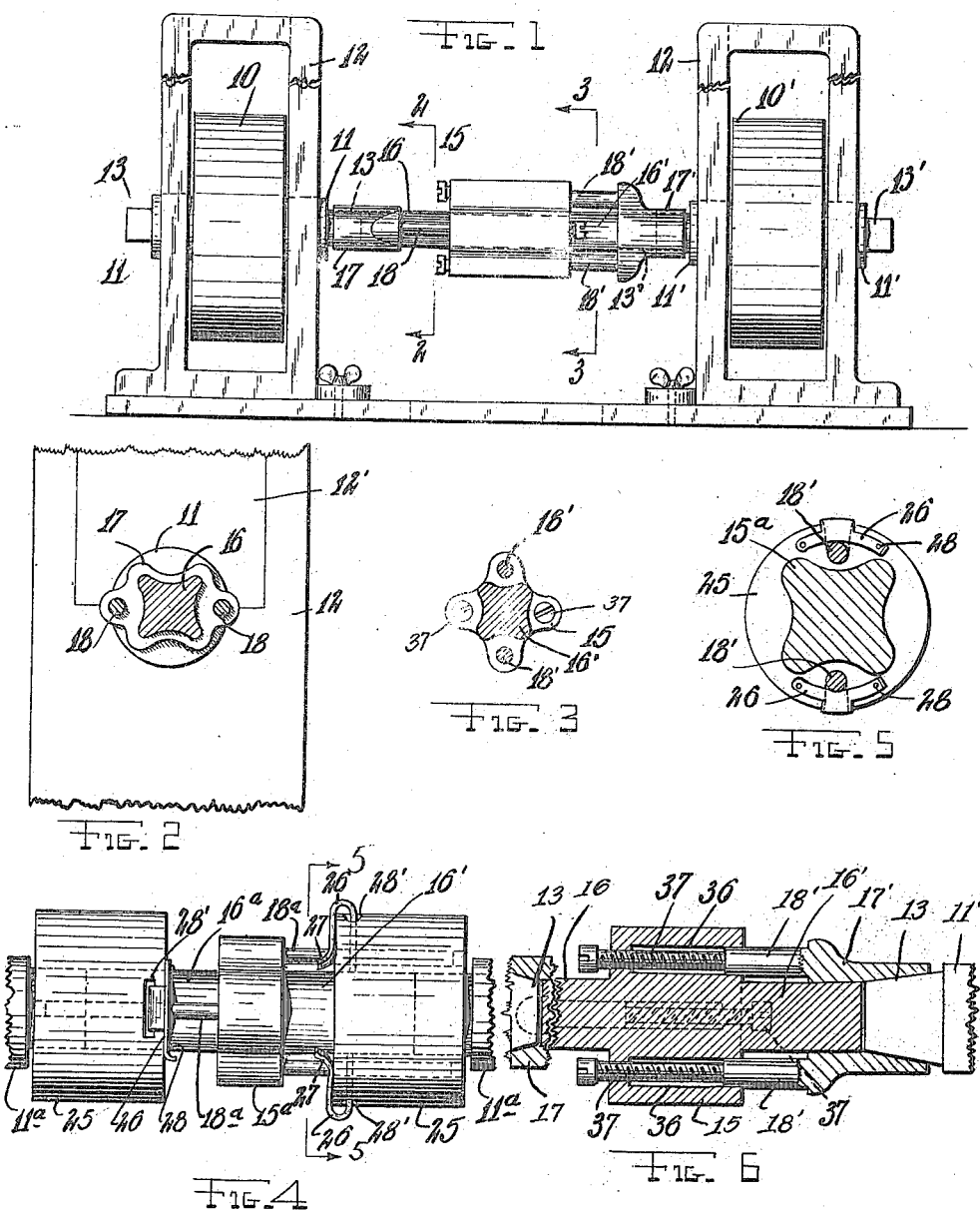
Inventor
Michael Zielinski
By
(signature)
Attorney Patented Oct. 14, 1924.

1,511,863

UNITED STATES PATENT OFFICE.

MICHAEL ZIELINSKI, OF PITTSBURGH, PENNSYLVANIA.

SHAFT COUPLING.

Application filed June 15, 1922. Serial No. 568,444.

*To all whom it may concern:*

Be it known that I, MICHAEL ZIELINSKI, a citizen of Poland, residing at Pittsburgh, in the county of Allegheny and State of Pennsylvania, have invented certain new and useful Improvements in Shaft Couplings, of which the following is a specification.

This invention relates generally to clutches, having more particular reference to a clutch intended for use on power shafting, the invention having for an object the provision of a clutch of a type which will permit of ready removal of sections of the shaft to change the size of transmission pulleys, or for other purposes.

For further comprehension of the invention, and of the objects and advantages thereof, reference will be had to the following description and accompanying drawings, and to the appended claims in which the various novel features of the invention are more particularly set forth.

Fig. 1 of the drawings is a longitudinal elevation showing a section of a power shaft having the invention applied thereto.

Fig. 2 is a transverse section on the line 2—2 of Fig. 1.

Fig. 3 is a detail transverse section on the line 3—3 of Fig. 1.

Fig. 4 is a longitudinal elevation showing a modified form of clutch.

Fig. 5 is a transverse section on the line 5—5 of Fig. 4.

Fig. 6 is a fragmentary longitudinal section of the form of clutch shown in Fig. 1.

Referring now to the drawings, 10 and 10′ indicate a pair of pulleys fixed on short power shaft sections 11 and 11′ respectively, these power shaft sections being journaled in frame elements 12 and 12′ and having tapering squared ends 13 and 13′ with which my improved clutch is adapted for engagement. My improved clutch comprises a central body 15 of generally cruciform cross section and having integral axial extensions 16, 16′ of corresponding cross section to the shaft ends.

Upon these extensions are slidably fitted the collars 17, 17′, which engage over the shaft ends 13, 13′ when in operative position. Fixed to adjacent ends of these collars are pairs of longitudinally projecting rods 18, 18′ which engage freely in longitudinal sockets 36 in the arms of the cruciform body 15. Threaded through the bottom walls of the sockets 36 are screws 37 which bear on the ends of the rods 18, 18′, to hold the collars 17, 17′, in their operative positions.

The frame elements 12 are provided with removable top bearing pieces 12′ which are removed when the pulleys 10 are to be changed.

When it is desired to remove or replace the pulleys 10 or 10′ the screws 37 are threaded outwardly, and the collars 17, 17′ moved along the extensions 16, 16′ until they disengage from the shaft ends 13, 13′ the clutch being then removed. The frame elements 12′ are then removed and the shaft sections with their pulleys removed and replaced, the above operations being reversed in again connecting up the two shaft sections. It will be understood of course that a line of shafting of any desired length, and comprising any desired number of pulleys may be employed.

In the modification shown in Figs. 4 and 5, I show a central cruciform body $15^a$ having squared extensions upon which pulley elements 25 of corresponding length fit slidably and engage squared ends of power shaft lengths $11^a$, being adapted to be held in operative position by means of latches 26 hinged to the pulleys and having fingers 27 projecting through radial slots 28′ therein behind rods $18^a$ carried by the body $15^a$. These latches are held in operative position by means of pins such as 28 fixed to the pulleys and engaging in suitable apertures in the latches, which latter are sprung over the pins when being moved to operative or inoperative positions.

Having thus described my invention what I claim as new and desire to protect by Letters Patent of the United States is as follows:

1. A clutch comprising a central body, polygonal axial extensions therefrom, collars slidable on said axial extensions, longitudinally extending rods fixed to adjacent ends of said collars and adapted to engage in apertures in said body, and adjustable abutment devices carried by said body and adapted to engage removably behind the ends of said rods.

2. A clutch comprising a central body, polygonal axial extensions therefrom, collars slidable on said axial extensions, longitudinally extending rods fixed to adjacent ends of said collars and adapted to engage in apertures in said body, and screws carried by said body and adapted to engage removably behind the ends of said rods, for securing said collars against inward movement on said body.

3. A clutch comprising a central body, polygonal axial extensions therefrom, collars slidable on said extensions, and means for securing said collars against inward movement toward said body, said means including longitudinally extending rods on said collars, and members on said body adapted to engage with said rods, said members comprising screws threaded longitudinally through said body and adapted to bear on the ends of said rods.

In testimony whereof I have affixed my signature.

MICHAEL (×) ZIELINSKI.
his mark

Witnesses:
FRANCES ZIELINSKI,
W. R. SHAUP.